United States Patent
Footer

(10) Patent No.: US 6,917,627 B1
(45) Date of Patent: Jul. 12, 2005

(54) HYBRID SATELLITE COMMUNICATIONS SYSTEM

(75) Inventor: Derek Footer, Mountain View, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 924 days.

(21) Appl. No.: 09/721,353

(22) Filed: Nov. 21, 2000

(51) Int. Cl.[7] ............................................. H04L 12/46
(52) U.S. Cl. ..................................... 370/466; 370/316
(58) Field of Search ............................... 370/316, 352, 370/353, 466

(56) References Cited

U.S. PATENT DOCUMENTS

| | | | |
|---|---|---|---|
| 5,563,648 A | 10/1996 | Menand et al. | 348/13 |
| 5,819,034 A | 10/1998 | Joseph et al. | 395/200 |
| 6,490,356 B1 * | 12/2002 | Beuque | 380/239 |
| 6,792,007 B1 * | 9/2004 | Hamada et al. | 370/542 |

* cited by examiner

Primary Examiner—Kenneth Vanderpuye
(74) Attorney, Agent, or Firm—Georgann S. Grunebach

(57) ABSTRACT

The present invention is a hybrid communications system (10) using satellite and terrestrial interfaces comprising an application server (12) with an application program (14) for the input of information by a user, the application server (12) being in electronic communication with a broadcast center (16), a communications satellite (18), an individual satellite dish (20), an integrated receiver decoder (22), and a Graphical User Interface (26) for a user to input information into the application program (14). The information is then transmitted over the Internet via a modem (28) in electronic communication with a communications server (30) for encapsulating information input by a user, an interactive server (32) for translating the information into a network protocol, and a vendor (34) that receives the information, wherein in one embodiment, at least a portion of the application program (14) received from the communications satellite (128) is stored in a buffer (24) before being transmitted through the modem (28).

20 Claims, 5 Drawing Sheets

HYBRID SATELLITE COMMUNICATIONS SYSTEM

BACKGROUND OF THE INVENTION

1. Field of the Invention

This invention relates to the field of hybrid satellite communications systems.

2. Description of Related Art

In the modern world, global communication systems abound. People use individual satellite dishes for direct to viewer ("DTV") television systems. In addition, satellites are used to provide Internet access, which is also available via conventional telephone and cable lines.

For example, satellite systems currently provide access to the Internet and allow users to send and receive e-mail. U.S. Pat. No. 6,016,388 to Dillon describes a two-way interactive communications system that requires a spoofing protocol for the downloading of data from a satellite.

However, a communications system that would allow a user to communicate with vendors via an application program supplied by a satellite system would have a dramatic increase in efficiency for the user of a satellite system such as a direct to viewer ("DTV") system. In the present invention, a satellite system such as a DTV system incorporates an application program on an application server. The present invention would allow a person to access the application over the satellite system and then input information to be transmitted to a vendor over the Internet either directly or as e-mail. This new type of hybrid communications system adds to the efficiency in the communication by the user. In addition, Internet communication such as e-commerce and e-mail communication could be performed by a user without a computer; all the user would need is a Graphical User Interface such as a television in electronic communication with an input device such as a keyboard or remote control. Thus, the present invention provides server-based applications on the satellite communication system for a user to have e-mail or other computer connectivity, or both.

Also, the present invention allows rapid and efficient development of multiple e-commerce applications for satellite services such as interactive television. E-commerce applications before this invention had their own individually developed and proprietary modules, causing inefficiency in e-commerce and confusion to the users. In addition, acquiring the rights to the individual e-commerce modules is expensive for a satellite service provider that would provide access to all of the different modules. The present invention has standardized modules, where the look, feel and functionality of the application accessed by the user is customized for different GUIs and different sets of functionality. Sophisticated e-commerce applications may be set up for vendors including the supplier of satellite service.

Furthermore, increased sophistication may be accomplished by the incorporation of an interactive server-based application used in conjunction with the direct or e-mail communication between the user and the vendor. Direct communication could be directly to the vendor's website on the Internet. Thus this invention makes applications such as e-commerce banking available to users that access applications available only through a satellite system.

A satellite service that uses the present invention would be able to internally develop applications and modules for applications so that vendors that do not have the ability to reach users of a satellite service may be able to reach those users. Furthermore, vendors may choose the modules from a variety provided by the satellite service.

BRIEF SUMMARY OF THE INVENTION

The present invention is a hybrid communications system using satellite and terrestrial interfaces comprising an application server with an application program for the input of information by a user, the application server being in electronic communication with a broadcast center. The broadcast center is in communication with a communications satellite. The communications satellite is in electronic communication with an individual satellite dish which is in communication with an integrated receiver decoder. The integrated receiver decoder is in electrical communication with a Graphical User Interface GUI for a user to input information into the application program. The invention also comprises a modem in electronic communication with a communications server for encapsulating information input by a user which is in turn in electronic communication with an interactive server for translating the information into a network protocol. The interactive server is in electronic communication with a vendor that receives the information. In one embodiment, at least a portion of the application received from the communications satellite is stored in a buffer before being transmitted through the modem.

In the preferred embodiment, the communications server multiplexes the user's information after it encapsulates the information. A single application server may house several application programs. Also, communication to the vendor may be via the Internet. The vendor may provide services such as banking services, retail sales services or the like. Communication of the application program from the application server through the broadcast center, through the communications satellite and into the individual satellite dish is preferably one-way, and the interactive server may be capable of translating the input information into TCP/IP. Communication between the modem, the communications server, the interactive server and the vendor is preferably two-way.

The communication server and the interactive server may be located at the same local center. Also, the application server further houses one or more application program modules, and the application modules may be standardized. However, the application modules may also be customized for different GUIs, different sets of functionality, or different vendors.

Another embodiment of the invention is a hybrid satellite communications system using satellite and terrestrial interfaces, comprising an application server including the application program. The application server is in electronic communication with a broadcast center that communicates with a satellite. An individual satellite dish is in electronic communication with the communications satellite and in electronic communication with an integrated receiver decoder. The integrated receiver decoder is in electrical communication with a GUI for a user to input information into the application program and a modem. The modem is in electronic communication with the communications server, the interactive server for translating the information into a network protocol, and an e-mail translation application for translating the information into e-mail protocol.

In another embodiment, the e-mail translation application is in its own one or more e-mail translation servers. The e-mail translation application may also be in electronic communication with an e-mail server. Also, the communication server and the interactive server may be located at the same local center. In addition, the information translated into e-mail protocol may be communicated over the Internet.

The hybrid satellite communications system may also comprise a system wherein the interactive server internally inputs the information into an interactive server-based application before it is translated into e-mail protocol. After the information is translated into an e-mail protocol, it may be transmitted by an e-mail server through the Internet.

In accordance with these and other objects which will become apparent hereinafter, the instant invention will now be described with particular reference to the accompanying drawings.

These figures are meant to be illustrative only and are not meant to limit the claimed inventions in any way.

DETAILED DESCRIPTION OF THE INVENTION

Figure 1:
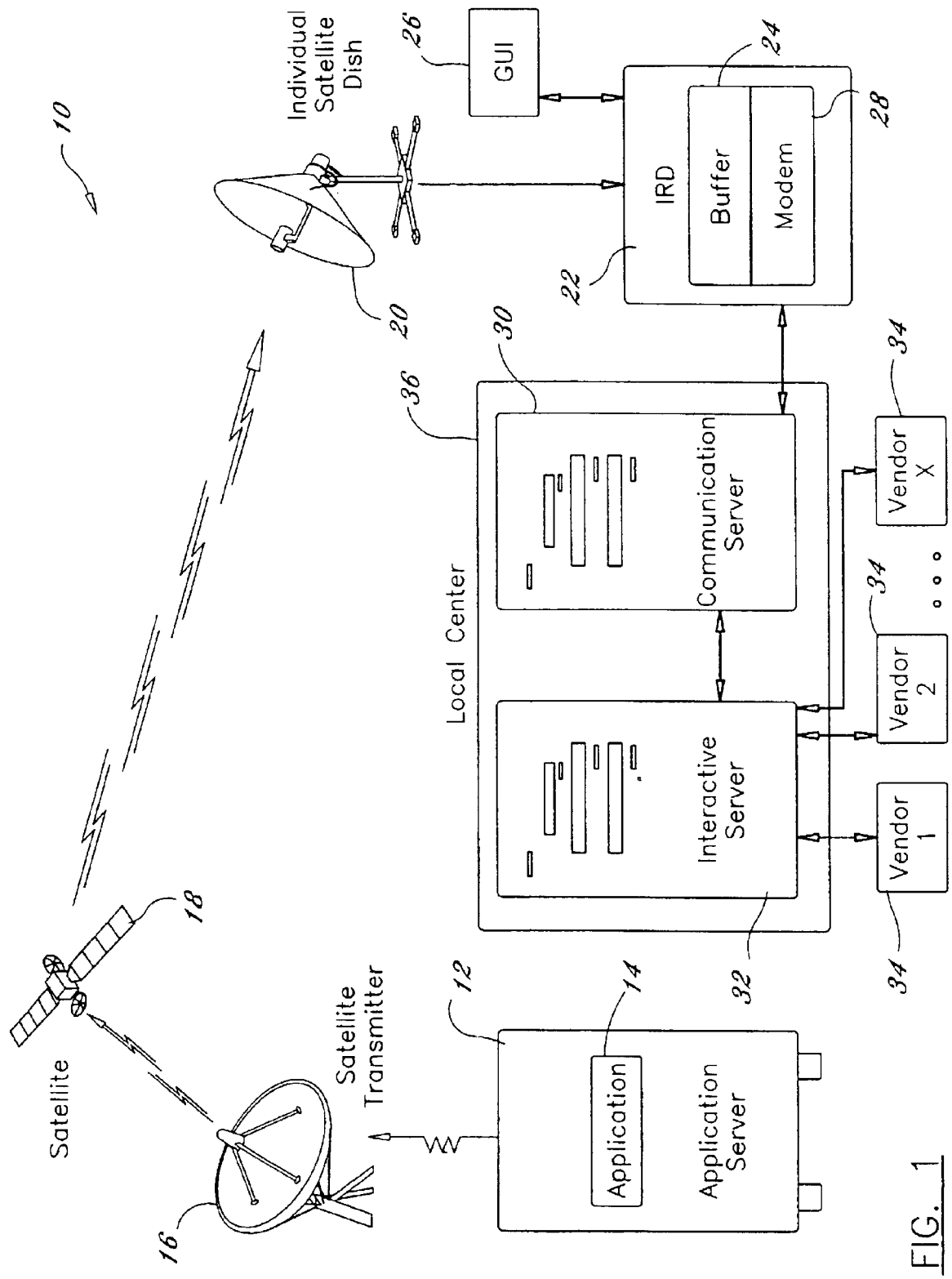
FIG. 1 is a diagrammic representation illustrating an embodiment of a hybrid satellite communications system of the present invention.

The invention is a hybrid satellite communications system described generally as 10 in FIG. 1. The invention provides one-way communication of an application program 14 via a communications satellite 18 and two-way communication for the user over the Internet.

In the system 10, at least one application server 12 contains at least one application program 14. Examples of the application server 12 contemplated include those developed by Telefonica for OpenTV or those developed by Galaxy Latin America for its direct to viewer ("DTV") satellite system. The server 12 provides an application program 14 that allows a user to access the application program 14 and input information through it. In the preferred embodiment, the application program is DirecTV e-mail, although other application programs may be used.

The application program 14 allows a user to input information as described below. The application program 14 preferably can operate with any interactive communications protocol, such as TCP/IP. For example, the application program may incorporate use of a Super TCP TCP/IP package. However, other embodiments within the scope of the invention are contemplated that use other standard and non-standard interfaces with TCP/IP software, such as UNIX, LINUX, SMTP, POP3, IMAP and proprietary AOL interfaces. Separate application servers 12 may be used to implement several different application programs 14, or one application server 12 may house several different application programs 14. A user would be able to input data into the application program 14 with a Graphical User Interface ("GUI") 26, described below. Also, in the preferred embodiment, the application server 12 is a Sun Microsystems server, although other servers known in the art may be used.

The application server 12 is in electronic communication with at least one broadcast center 16 for communicating with at least one communications satellite 18. The electronic communication between the application server 12 and the broadcast center 16 may be by a local area network (LAN) or wide area network (WAN) such as the Internet. The hardware may include a T1 line or similar means. In the preferred embodiment, the broadcast center 16 comprises components including one or more video servers, multiplexers and uplink signal processing systems. An example of a communications satellite 18 for this invention would be a Galaxy 8'i, such as the one used by Galaxy Latin America for its direct to viewer ("DTV") services.

The communications satellite 18, as shown in FIG. 1, is further in electronic communication with at least one individual satellite dish (*ISD*) 20. The ISD 20 is in electronic communication with at least one integrated receiver decoder ("IRD") 22. The ISD 20 receives a signal from the communications satellite 18 containing the application program 14 and transfers the information in the signal to the IRD 22. The IRD 22 may also store information including at least a portion of the application program 14 received in the ISD 20 in a separate buffer memory 24. Also, in the preferred embodiment the IRD is a Thompson GLA-2 OpenTV IRD, although other similar devices known in the art may be used.

The IRD 22 is also in electronic communication with a graphical user interface (*GUI*) 26, such as a television set in electrical connection with a remote control or a keyboard for a user to input of information into the application program 14.

The GUI 26 allows the input aspect of the application program 14 to be accessed by the user and allows the user to input data into the application program 14. The GUI 26 is also in electronic communication with a modem 28, which allows transmission of data from the GUI 26. Data may also be transferred to the GUI 26 via the modem 28.

The modem 28 is in electronic communication with a communications server 30. The communications server 30 may be a standard communications router. In the preferred embodiment, the communications server is a Lucent MAX 4020. The communications server 30 may also be a Lucent MAX TMT, or any network access server or remote access server capable of encapsulating a user's input into the application program 14 through the GUI 26.

The communications server 30 encapsulates the data input by the user through the GUI 26. Encapsulation may be performed on a computer such as a Lucent MAX 4000 or its equivalent. The encapsulation provides the communications server 30 with the ability to multiplex data that enters the communications server 30. This multiplexing allows the communications server 30 to operate with greater efficiency and with a greater number of users than if the multiplexing were not accomplished.

The input information is then communicated to one or more interactive servers 32 in electronic communication with the communications server 30. The interactive server 32 translates the data encapsulated by the communications server 30 into a networking protocol such as TCP/IP or file transfer protocol (*FTP*). In the preferred embodiment, encapsulation is performed by a computer program such as the Telefonica Interactive Server Application. However, other programs are known in the art. The data is then transmitted to various vendors 34 by means such as a LAN or WAN, including the Internet. Data communication may be two-way between the modem 28, communications server 30, the interactive server 32 and the vendor 34. In one embodiment, as shown in FIG. 1, the communications server 30 and the interactive server 32 may be at the same local center 36.

Figure 2:
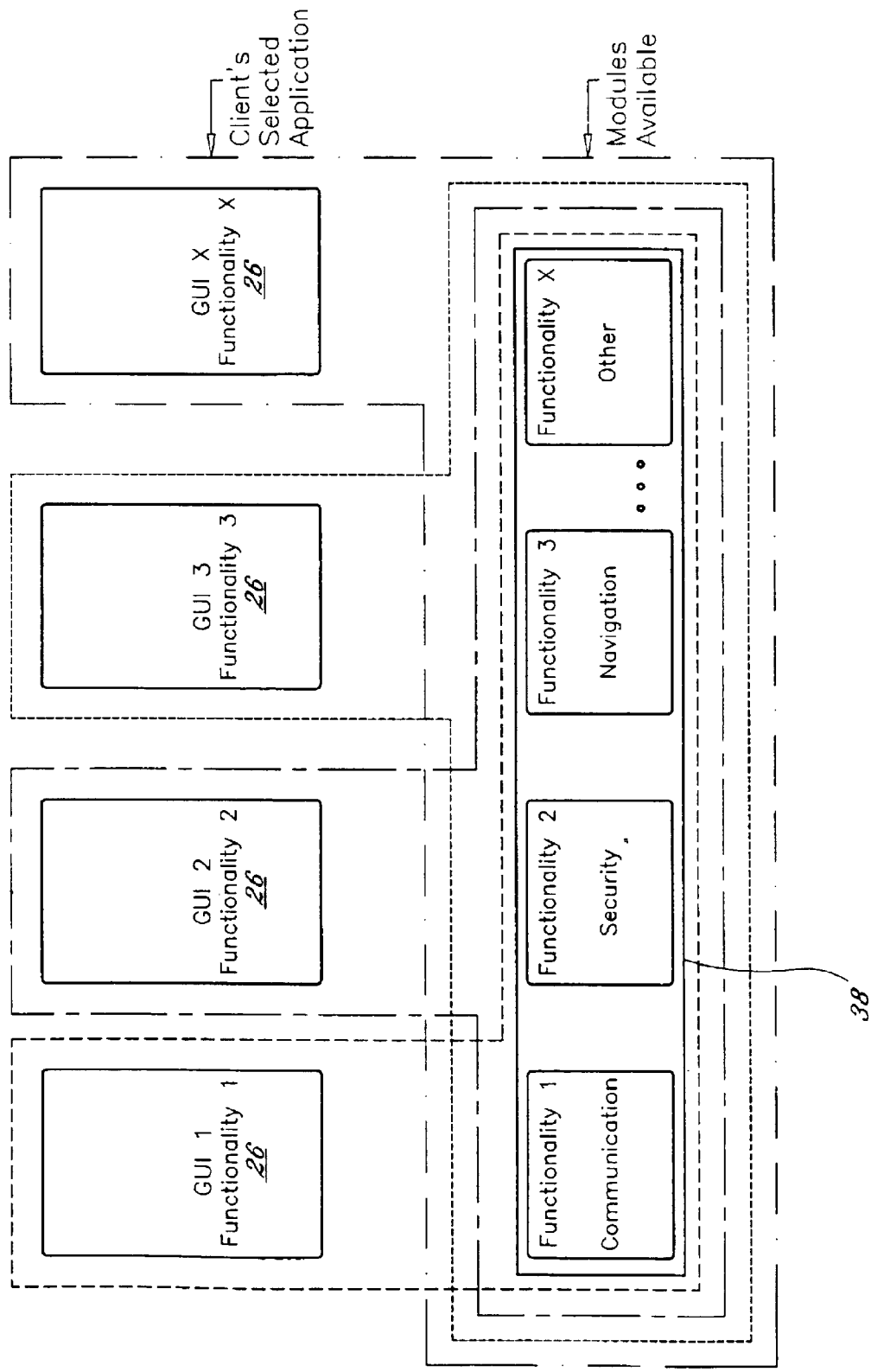
FIG. 2 is a diagrammic representation of the use of different modules by different graphical user interfaces in the present invention.

As shown in FIG. 2, several applications 14 may be supplied by this invention. In one example, a single application server 12 houses several application program modules 38. As shown, application program modules 38 may be in the areas of communications, security, navigation, and e-commerce. The separate application program modules 38 may be standardized to allow rapid and efficient development of multiple e-commerce applications. Even though the application programs 14 may be standardized, the look, feel and functionality of each application program module 38 for access to the application program 14 may also be customized for different GUIs 26, for different sets of functionality or for different vendors 34.

Figure 3:
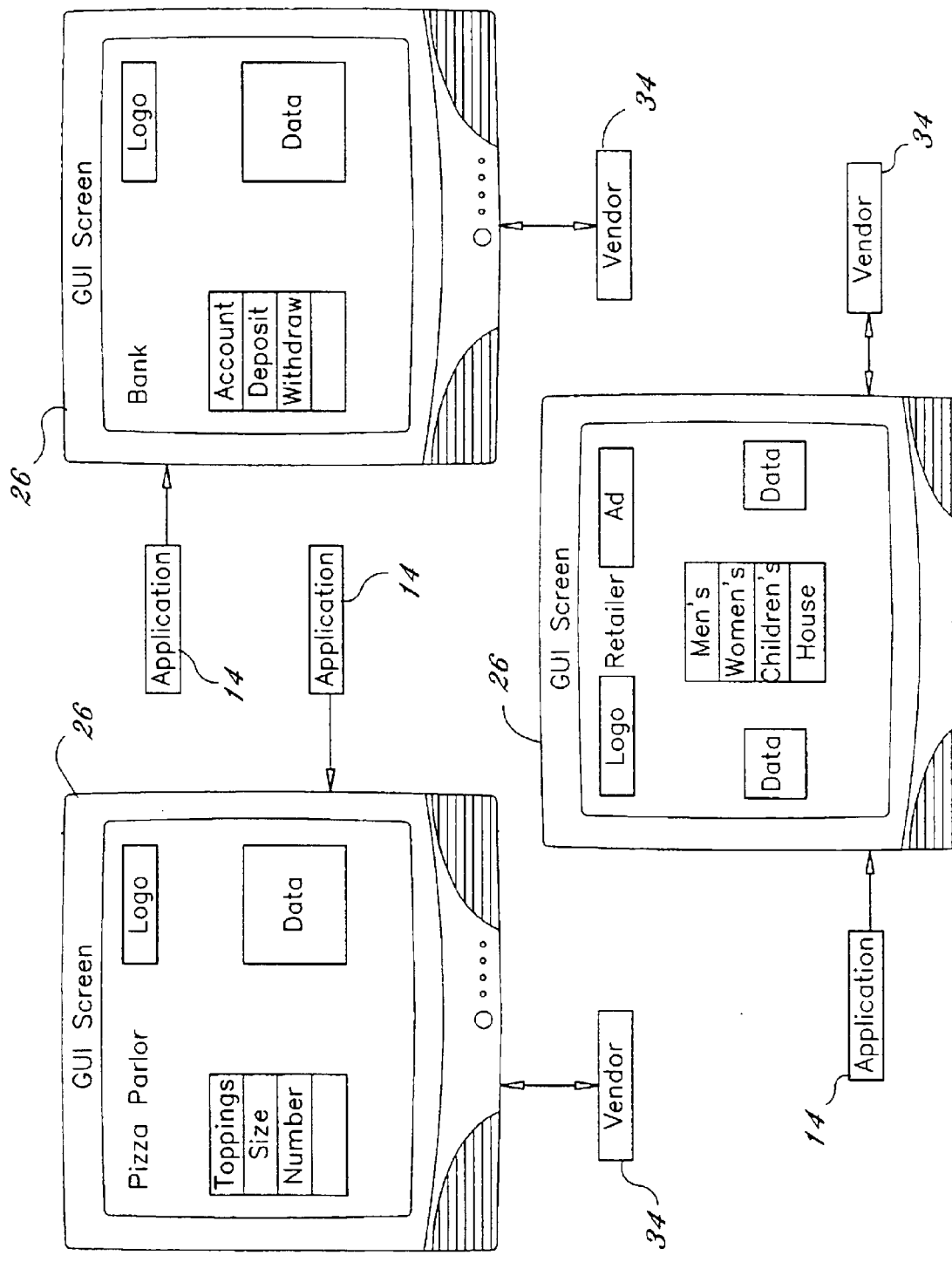
FIG. 3 is an illustration of different screens that are available for use in the present invention.

One embodiment of the invention is described in FIGS. 1 and 3 and detailed below. An application program 14 is received by the user's ISD 20 and IRD 22. The application program 14 may provide services such as banking or e-commerce applications. It may also use a common security standard for the services and use a proprietary communications protocol. Depending upon the application program 14 accessed, or the type of GUI used by the user, the user may access different application modules 38, as shown in FIGS. 2 and 3. The user accesses the application program 14 via a GUI 26 such as a keyboard and television. The user views the application program 14 on the television and inputs information on the keyboard. The input information is then transmitted via modem 28. The information is then encapsulated by the communications server 30, and may be multiplexed by the communications server to increase efficiency in the system. The information is then translated to a network protocol and communicated with one or more vendors 36.

For example, as shown in FIG. 3, a user may order pizza through the screen provided by one application program 14. The user may specify toppings, size and number of pizzas ordered. The pizza vendor/subscriber to the application program 14 also may have its logo displayed. Through other application modules 38, different screens may appear on the user's GUI 26. Thus, a user may use different screens on the GUI 26 to input different types of information. Banking and retail shopping screens may be used and are also illustrated in FIG. 3. Ticket purchasing and other similar uses are known in the art and also are contemplated.

Figure 4:
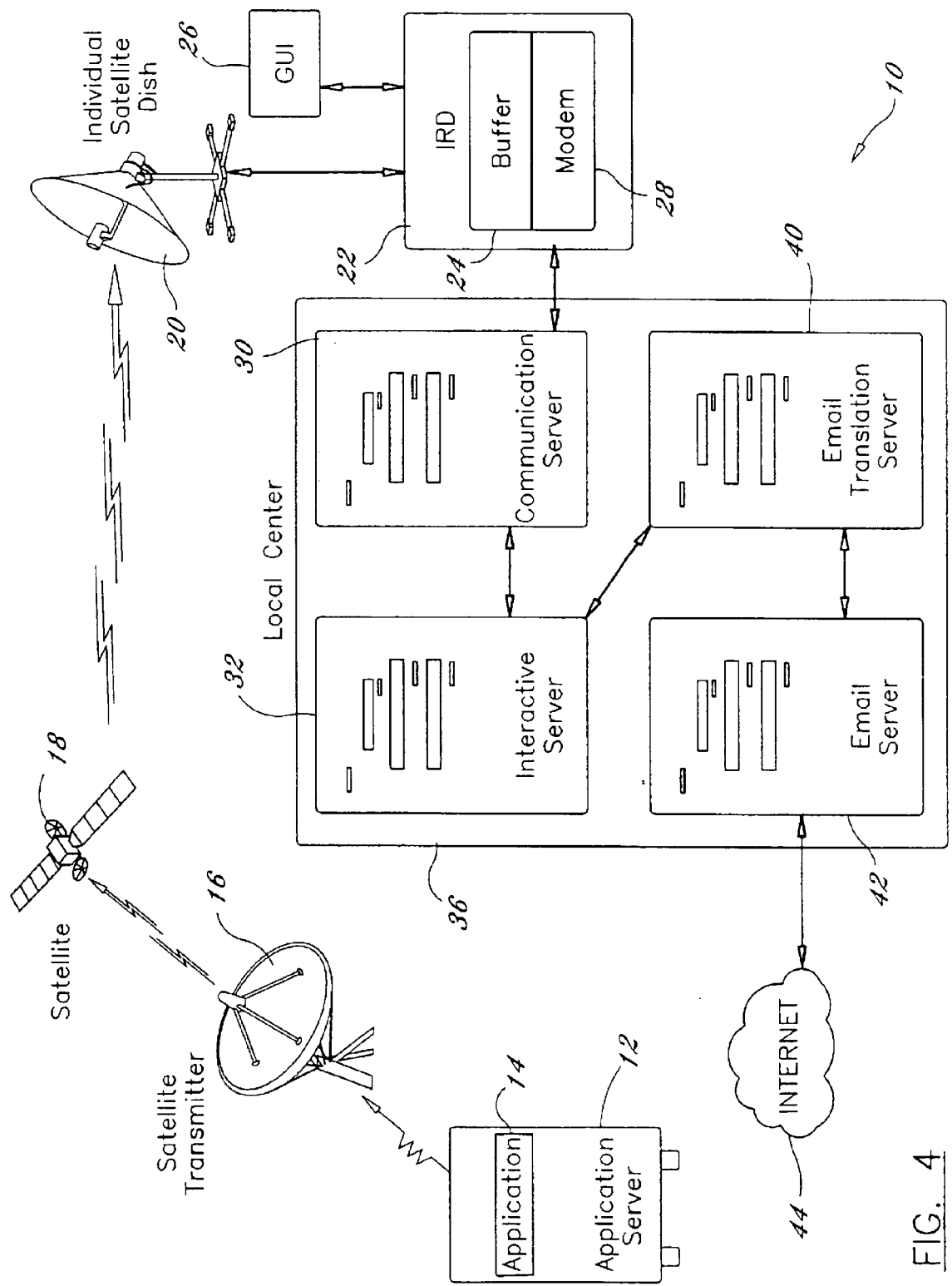
FIG. 4 is a diagrammic representation illustrating another embodiment of a hybrid satellite communications system of the present invention.

In another embodiment, illustrated in FIG. 4, after information input by the user is translated into network protocol in the interactive server 32, it is translated into e-mail protocol by an e-mail translation application in an e-mail translation server 40. The preferred e-mail protocol is Simple Mail Transfer Protocol. However, other protocols are known in the art. As shown in FIG. 4, an e-mail translation server 40 may be in the same local center 36 as the communications server 30 and the interactive server 32. The information translated into e-mail protocol is then e-mailed over a LAN or WAN such as the Internet via known means in the art. Also, e-mail translation in the e-mail translation server 40 and translation to network protocol in the interactive server 32 may be performed in the same server. In addition, the system 10 may include a standard e-mail server 42 to route the information input by the user as part of an e-mail message to one or more vendors 34 over the Internet 44. The preferred e-mail server 42 is a standard Internet server and allows the user's information to travel directly to and from the user to vendors 34 without being translated into e-mail.

Figure 5:
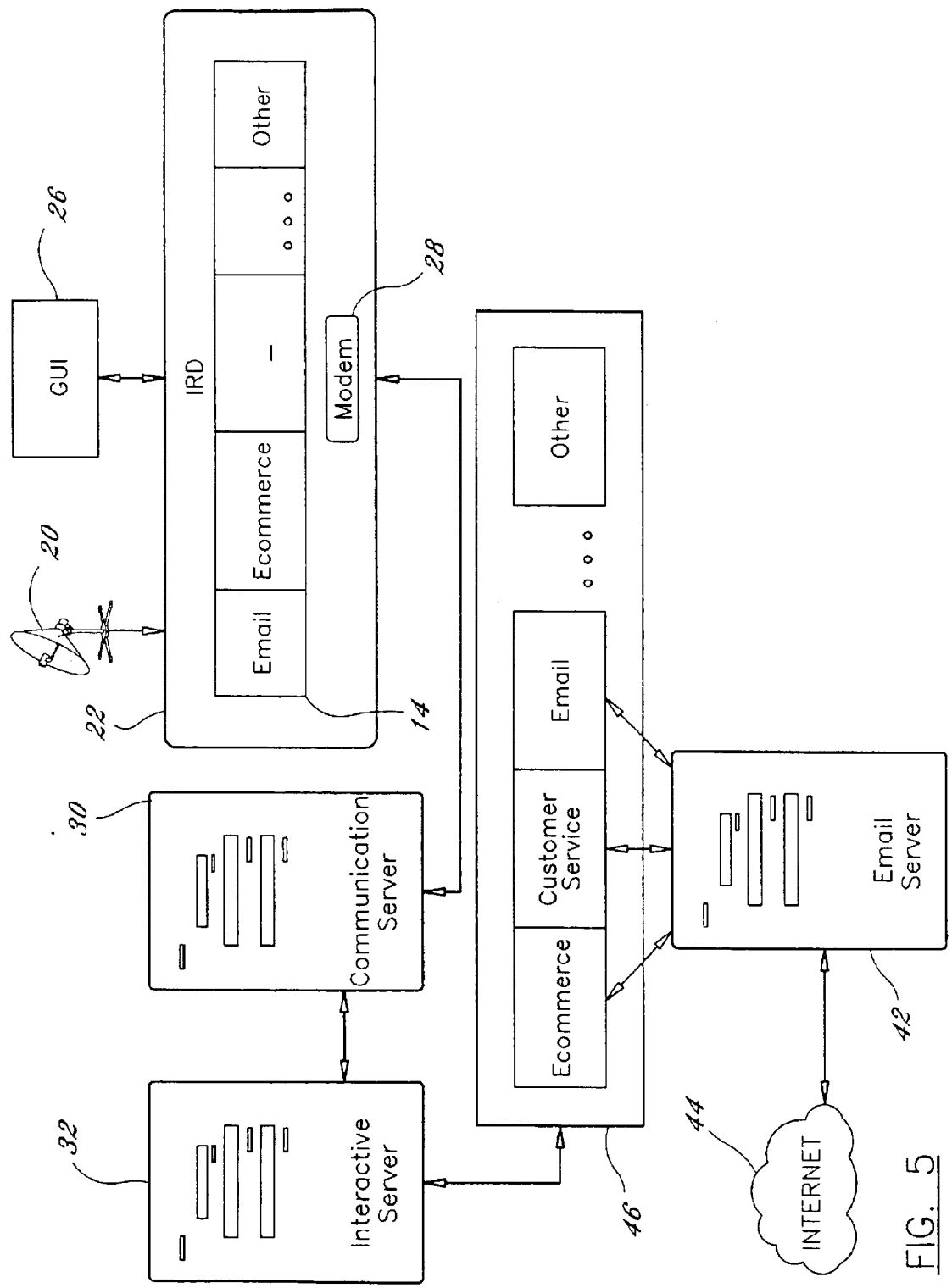
FIG. 5 is a diagrammic representation illustrating another embodiment of a hybrid satellite communications system of the present invention.

A slightly different embodiment of the invention is illustrated in FIG. 5. One or more application programs 14 arrive from the communications satellite 18 through the ISD 20 to the IRD 22. The application program 14 is displayed on the GUI 26. The user inputs information via the GUI 26, and the information is transmitted to the communications server 30 via the modem 28. For example, the application program 14 may provide an on-screen form to be filled out via the GUI 26, wherein the form is used as part of an e-mail message for the transaction of electronic commerce. Upon completion of the form, the user transmits the information input into the form through the modem 28 to the communications server 30 where it is encapsulated.

The information is then transmitted to the interactive server 32 where it is translated into network protocol. The interactive server 32 then internally inputs the information into an interactive server-based application 46. Examples of interactive server applications 46 include applications for e-commerce, such as ordering pizza, banking, customer service for a DTV service for the ordering of pay-per-view events or parental blocking of specific programs. Also, an interactive server-based application 46 may include e-mail, including mail to a pre-programmed address list that also resides on the interactive server 32. In the preferred embodiment, the interactive server-based application is the DirecTV e-mail interactive server application. The information may then be converted into e-mail protocol and distributed by an e-mail server 42 through a LAN or WAN such as the Internet to the intended recipients. Other applications are known and are readily apparent for this invention.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A hybrid communication system using satellite and terrestrial interfaces comprising:
   a. at least application server wherein said at least one application server transmits and recieves data to and from at least one broadcast center;
   b. at least one application program residing on each application server;
   c. at least one integrated receiver decoder (IRD), where each IRD includes a graphic user interface (GUI) and connects to a modem, and each IRD receives signals from the at least one broadcast center;
   d. at least one communication server where the at least one communication server receives data from each modem; and
   e. an interactive server connected to each communication sever, where each interactive server receives data from each communication server and translates the received data to a network protocol for transmission via a network to at least one vendor.

2. The hybrid communications system according to claim 1, further comprising:
   a. at least one communication satellite transmitting and receiving data between the at least one application server and the at least one broadcast center; and
   b. a satellite dish connected to each IRD, where the satellite dish receives and transmits signals from the at least one broadcast center to each respective IRD.

3. The hybrid communications system according to claim 2, wherein said at least one IRD receives at least one application program via signals received by the individual satellite dish.

4. The hybrid communications system according to claim 3, wherein a portion of any application program received by the satellite dish is stored in a buffer before being transmitted through the modem.

5. The hybrid communications system according to claim 1, wherein each communication server encapsulates and multiplexes the data received via each modem.

6. The hybrid communications system according to claim 1, wherein a vendor connects to the interactive server via the network.

7. The hybrid communications system according to claim 6, wherein the vendor is selected from the group consisting of a restaurateur, a banker and a retailer.

8. The hybrid communications system according to claim 1, wherein the network protocol includes a TCP/IP protocol.

9. The hybrid communications system according to claim 1, wherein the at least one communication server and each interactive server reside at a common location.

10. The hybrid communications system according to claim 1, wherein the at least one application saver further includes at least one application program module.

11. The hybrid communications system according to claim 10, wherein the at least one application program module is standardized.

12. The hybrid communications system according to claim 1, where the at least one application program module is customized for the respective GUI.

13. The hybrid communications system according to claim 11, wherein the at least one application program module includes customized functionality.

14. The hybrid communications system according to claim 11, wherein where the at least one application program module is customized for different vendors.

15. The hybrid communications system according to claim 1, wherein the at least one application program includes at least one email translation application where each email translation application translates data into email protocol.

16. The hybrid communications system according to claim 1, further comprising.

at least one email translation server.

17. The hybrid communications system according to claim 16, wherein the at least one email translation server includes email translation applications that translate data to email protocol.

18. The hybrid communications system according to claim 15, where data translated into email protocol is transmitted over the network.

19. The hybrid communications system according to claim 15, where data translated into email protocol is transmitted over the network.

20. A method for providing hybrid communication using satellite and terrestrial interfaces, comprising the steps of:

providing at least one application server;

storing at least one application program on the at least one application server;

transmitting the at least one application program at least one broadcast center;

transmitting the at least one application program from the at least one broadcast center to at least one communications satellite;

transmitting the at least one application program from the at least one communications satellite to at least one integrated receiver decoder (IRD) via a satellite dish connected to each respective IRD;

connecting a graphic user interface (GUI) to each IRD:

inputting data into a selected application program received by the IRD via the GUI;

encapsulating the input data;

translating the input data to a network protocol; and transmitting the input data to at least one vendor.

* * * * *